United States Patent [19]

Tetzlaff

[11] 3,918,870
[45] Nov. 11, 1975

[54] INJECTION MOLDING MACHINE
[75] Inventor: Roger W. Tetzlaff, Orrville, Ohio
[73] Assignee: Norton Company, Worcester, Mass.
[22] Filed: Feb. 13, 1974
[21] Appl. No.: 441,945

[52] U.S. Cl. .................. 425/251; 425/806; 425/51; 425/228
[51] Int. Cl.² ...................... B29G 3/00; B29H 3/12
[58] Field of Search.... 425/251, DIG. 228, DIG. 51, 425/806

[56] References Cited
UNITED STATES PATENTS

| 2,274,279 | 2/1942 | Shaw | 425/251 |
| 2,582,260 | 1/1952 | Kutik | 425/251 |
| 2,865,050 | 12/1958 | Strauss | 425/DIG. 229 |
| 3,748,075 | 7/1973 | Taylor | 425/251 |
| 3,836,306 | 9/1974 | Pasch et al. | 425/251 |
| 3,859,024 | 1/1975 | Pasch et al. | 425/251 |

FOREIGN PATENTS OR APPLICATIONS

| 2,164,219 | 12/1971 | Germany | 425/251 |

Primary Examiner—Francis S. Husar
Assistant Examiner—Carl Rowold
Attorney, Agent, or Firm—Oliver W. Hayes

[57] ABSTRACT

An improved injection molding machine is described wherein the so-called "wasteless" process is achieved by insulating the supply of raw rubber from the mold chamber which is heated during high pressure molding to cure the rubber parts being molded. The present invention is an improvement in the device described in German Offenlegungsschrift No. 2164219 of July 5, 1973, particularly with respect to the details of construction of the insulating plate. The insulating plate in the present invention is preferably made of two pieces intimately bonded by means of a suitable adhesive, with that portion adjacent the mold being formed of a good insulating material and that portion adjacent the supply of rubber being formed of metal to provide adequate strength particularly for withstanding stresses occurring due to breaking of the sprues which extend partially but not completely, through the insulating plate.

1 Claim, 2 Drawing Figures

INJECTION MOLDING MACHINE

BACKGROUND OF THE INVENTION

The present invention is directed to an improved injection molding machine for processing of heat cured elastomers and is particularly directed to improvements in such machines of the type described in German Offenlegungsschrift No. 2164219 dated July 5, 1973, which, in turn, is an improvement over the "flashless" molding equipment of the type described in U.S. Pat. No. 2,883,704 to Jurgeleit. In such equipment there is a multiple cavity mold which is filled by the elastomer (for example, uncured rubber), the elastomer being supplied from an injection cylinder which is filled with enough material to exceed the capacity of the cavities and the sprues in the mold. In order to prevent cure of the rubber remaining in the cylinder after the cavities have been filled, and while the rubber in the cavities is being cured, the German patent provides an insulating board between the cavities and the injection cylinder. The present invention is directed to improvements in the design of this insulating board.

In the present invention there are two principal improvements which are lacking in the product described in the above-mentioned German Offenlegungsschrift. The first of these is that the insulating board made in accordance with the present invention is a composite board comprising a strong steel plate which is adjacent the injection cylinder and which is firmly bonded to an insulating board adapted to mate with the multi-cavity mold.

In order to permit passage of the uncured rubber from the injection cylinder into the molds, suitable sprues are provided in the composite injection plate; and these are lined with material such as tetrafluoraethylene polymer (TFE), to which neither the cured or uncured rubber will adhere strongly. These TFE inserts are described in the above-mentioned Offenlegungsschrift, and the second feature of the present invention involves an improvement in the design of these inserts. In the present invention the TFE inserts are provided with upwardly and downwardly facing double cones which meet at a narrow-necked down portion of the TFE insert corresponding to the region of transition from cured to uncured rubber. This double cone arrangement has the advantage of providing a rather large head to the sprue which extends downwardly into the mold cavity to permit easy removal of the sprue from the mold cavity after the insulating plate has been separated from the mold cavity. The conical shape on the top side of the teflon insert, e.g. the side facing the injection cylinder, provides a smooth flow of raw rubber into and through the insulating plate to permit rapid and complete filling of the mold cavity on each stroke of the injection plunger.

BRIEF DESCRIPTION OF THE DRAWINGS

Referring now to the drawings, there is shown one preferred modification of the invention as applied to an injection molding system of the type described in the above-mentioned German Offenlegungsschrift No. 2164219.

FIG. 1 shows the injection unit with a 1-cavity mold, identified as 10, for the molding of brake-cups 12 in the precision-wasteless molding process. Each cavity consists of a lower insert 1, a center insert 2 and top insert 3. The latter faces the injection cylinder 13 of the injection unit, which contains the material 14 to be injected, in this case, natural rubber. The lower insert is inserted into a pocket of plate 6 and protrudes somewhat above the surface of this plate. The center insert 2 and top insert 3 are contained in retainer plates 8 and 9. For illustrative purposes only, 1 cavity is shown, however, in practice a much larger number (on the order of hundreds) of cavities are installed into retainer plates 6, 8 and 9. The injection cylinder 13 contains piston 14, which moves vertically inside the cylinder. The composite insulating board 20 is attached to cylinder 13 facing the mold below.

Figure 1:
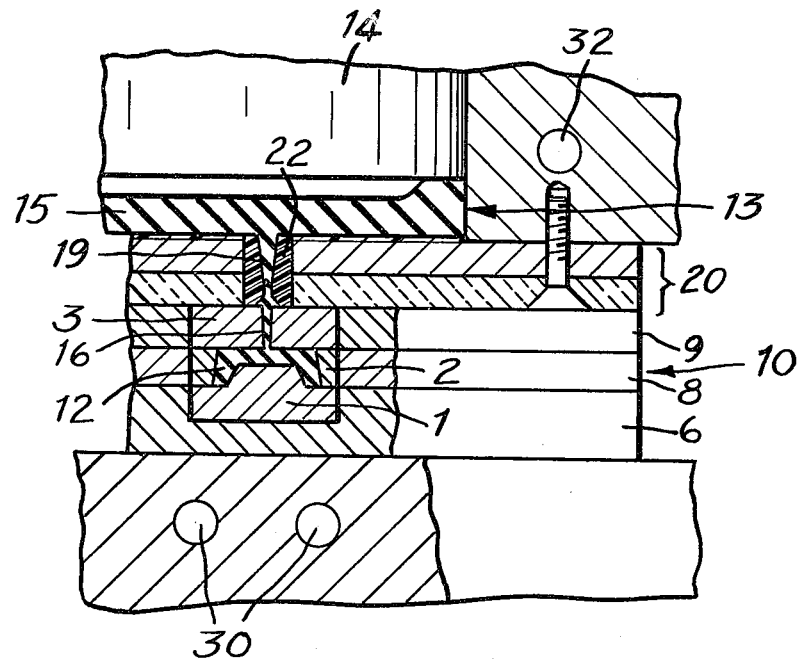
FIG. 1 is a fragmentary cross-sectioned view of an injection machine and a typical mold.

In starting the process, the space defined by insulating board 20, injection cylinder 13 and piston 14 is charged with the material 15 (e.g. uncured rubber) to be injected. The amount of rubber 15 is metered to be enough for one shot plus a cushion of approximately inch. Thereafter, the rubber 15 contained in injection cylinder 13 is pressurized and thereby transferred through sprue 19 in the insulating board 20 as well as through sprue 16 in the upper mold part 3. This will fill cavity 12 in the mold 10. While the rubber is being injected, the air contained in the cavity space will be ejected through the grinds between cavity parts 1, 2 and 3 as described in U.S. Pat. No. 3,151,360. This grind space will allow only gases to escape and not the rubber. During the curing process the injection cylinder 13 and the rubber 15 are under continuous pressure as well as cavity 12. This allows continuous escape of gases. However, the rubber is contained in the cavity space, thereby assuring a flash-free part. At the end of the cure cycle, the mold 10 is lowered away from insulating plate 20. The mold retainer plates 6, 8 and 9 are separated and the parts ejected. Since the injection channel 19 in the insulating board 20 is fitted with insert 22, which has a nonsticking characteristic. This allows the rubber to be injected, to flow freely and also assures withdrawal of the sprue after break-off. The break-off will occur at the dividing line between cured and uncured rubber. This is essential so that a continuous flow of fresh unvulcanized rubber is available for the next cycle.

Figure 1A:
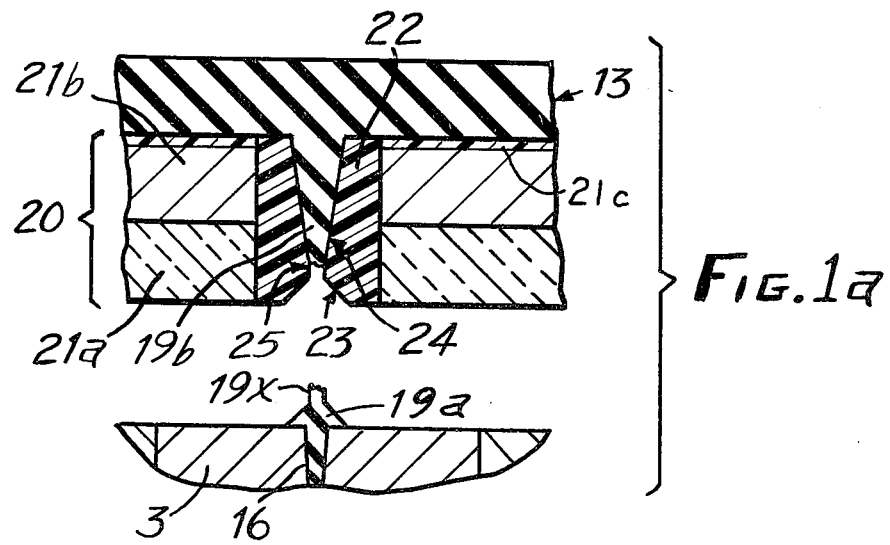
FIG. 1a is an enlarged partial cross-sectional exploded view to further illustrate the details of construction.

According to FIG. 1a, the components are shown separated after the cure is completed with the cured molded part and the sprue shown in their respective positions. The purpose of the insulating board 20 is to insulate the material contained in the injection unit from the heat traveling through the mold. According to FIG. 1a, the injection unit is lifted off the mold and shows the separation of the sprue 19a at the cure line, labeled as 19x. The cured sprue 19a is scrap and has to be discarded while uncured material, 19b, still remaining in the insulating board 20 can be used for the next cycle. It should be understood that this invention is not limited only to the illustration shown here, but may also be used for screw-type injection molding machines.

Particular attention should be called to the details of the insulating board and teflon insert as shown most clearly in FIG. 1a. As can be seen, the insulating board consists of two plates 21a and 21b, 21a being an epoxy asbestos mixture of the type described in the above-identified German Offenlegungsschrift No. 2164219. 21b is a high strength steel plate which is bonded to the asbestos board 21a by an epoxy cement. The TFE insert 22 is formed of two divergent conical passages. The lower conical passage 23 faces down towards the sprue 16 leading to the mold cavity. The upper conical passage 24 faces upwardly towards the supply of uncured elastomer, such as rubber. Between the two conical passages is a small straight section 25 positioned at the locus of the line between cured and uncured rubber.

The arrangement described above provides for a strong insulating plate which effectively prevents transmission of heat from the high temperature mold to the relatively lower temperature supply of uncured rubber. In the preferred embodiment the upper surface of the steel plate 21b is also coated with TFE so that when piston 14 is lifted the rubber charge which adheres thereto will be stripped from the upper surface of the plate 21b and a new charge of uncured rubber can be conveniently inserted into the cylinder 13.

As mentioned previously, the construction of the TFE insert 20 provides for a relatively large headed cured sprue 19a which can be readily grasped by manual or mechanical means to break the sprue from the molded part 12 while providing a minimum amount of cured rubber in region 19x where the transition from cured to uncured rubber takes place. The upwardly facing passage 24 provides for smooth feed of the uncured rubber during the injection cycle and also provides a minimual cross-sectional area at the transition point between the cured and uncured rubber.

While shown only schematically in the drawings, it is essential that suitable heating means such as channels 30, for heating fluid such as steam be provided adjacent the mold and cooling channels, such as 32, be provided adjacent the upper part of the injection cylinder to maintain this cylinder at a temperature on the order of 120F to prevent curing of the rubber in the injection cylinder but permitting sufficient heating of the uncured rubber to improve its fluidity.

While the preferred embodiments of the invention have been described above, numerous modifications thereof are obviously possible to one skilled in the art. For example, other elastomers which are subject to heat-curing can be employed instead of natural rubber. Generally, while TFE is a preferred material for insert 22, other plastics can be employed provided that the uncured and cured elastomer does not adhere thereto. In this connection, it was mentioned previously that the upper surface of the steel plate 21b is preferably coated with a nonadherent surface such as TFE (as shown at 21c). In the preferred embodiment of the invention the lower surface of the piston 14 is of steel and is preferably uncoated so that the uncured rubber will adhere thereto. Thus as the piston 14 is moved upwardly the whole mass of uncured rubber is pulled away from the composite insulating board 20, thus permitting a new charge of rubber to be inserted for the next injection cycle.

If desired, the order of the parts can be reversed, that is, the mold can be above the injection cylinder and the injection stroke can be upwardly. Equally the cylinder and mold can be rotated 90 so that the plane of insulating board 20 is vertical; in this case the injection piston 14 moves horizontally.

What is claimed is:

1. In an injection molding system wherein an uncured elastomer is injected into a mold chamber from a supply chamber having a piston, the mold chamber is heated to cure the injected elastomer and the supply chamber is insulated from the mold chamber by an insulating plate having TFE-lined feeding holes through the insulating plate, the improvement comprising means for causing removal of uncured flash material by said piston wherein the insulating plate is a composite plate having a metallic backing member adjacent the elastomer supply and an insulating layer adjacent the mold surface, the upper surface of the metallic backing member having a TFE coating, each TFE lined feeding hole having an outwardly facing conical feeding passage and an inwardly facing conical feeding passage, the apexes of the two conical passages being joined by a narrow cylindrical passage and being aligned with a sprue, the narrowest portion of each feeding passage being arranged at the position where the curing process normally stops.

* * * * *

UNITED STATES PATENT OFFICE
CERTIFICATE OF CORRECTION

Patent No. 3,918,870  Dated November 11, 1975

Inventor(s) Roger W. Tetzlaff

It is certified that error appears in the above-identified patent and that said Letters Patent are hereby corrected as shown below:

Column 2, line 22: after "approximately" insert - 1/8 -

Column 4, line 19: after "90" insert the degree sign (°)

Signed and Sealed this twenty-fourth Day of February 1976

[SEAL]

Attest:

RUTH C. MASON
*Attesting Officer*

C. MARSHALL DANN
*Commissioner of Patents and Trademarks*